Aug. 12, 1941.　　J. P. BENOIT ET AL　　2,252,391
GLASS BLOWING MACHINE
Filed Dec. 17, 1938　　15 Sheets-Sheet 9

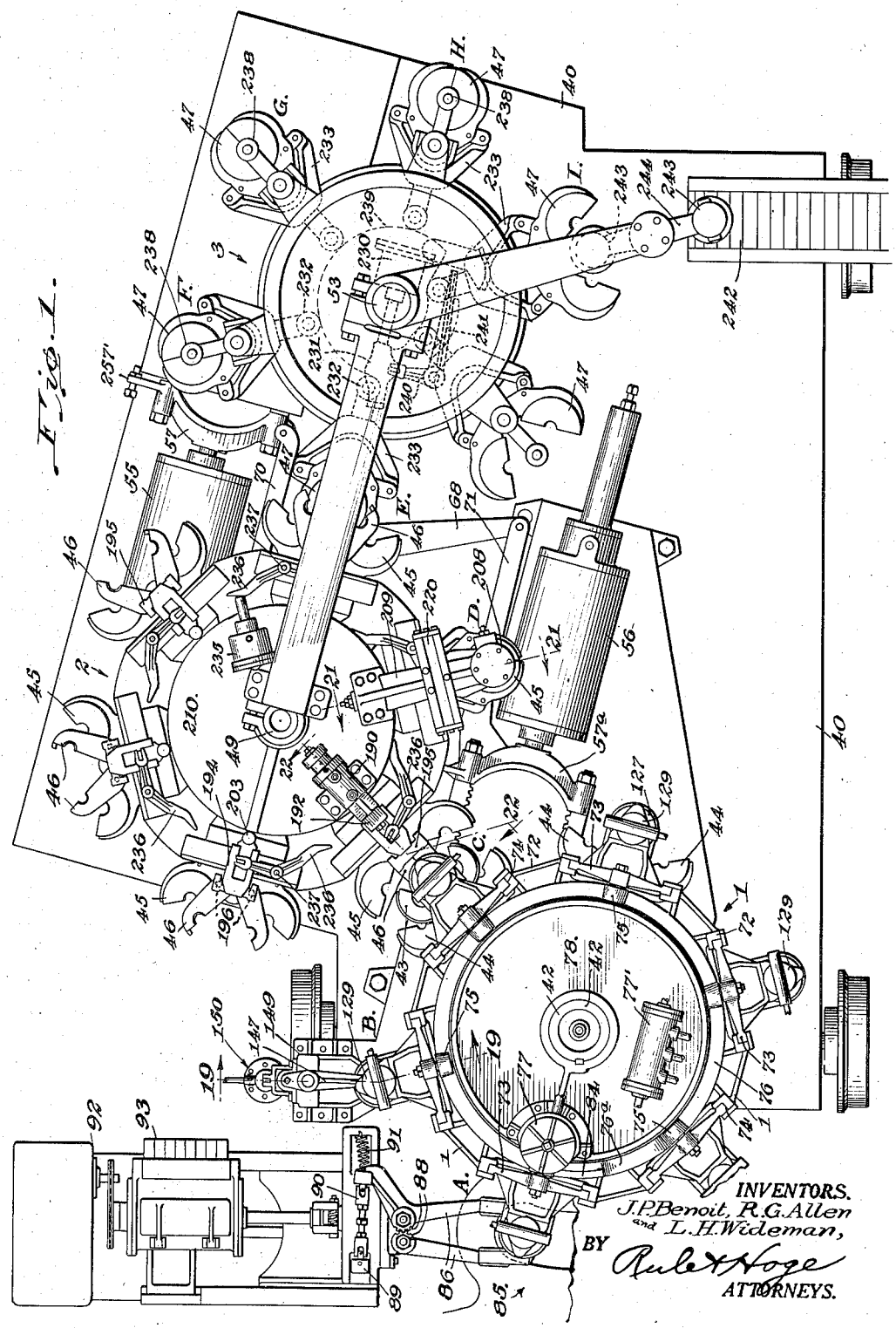

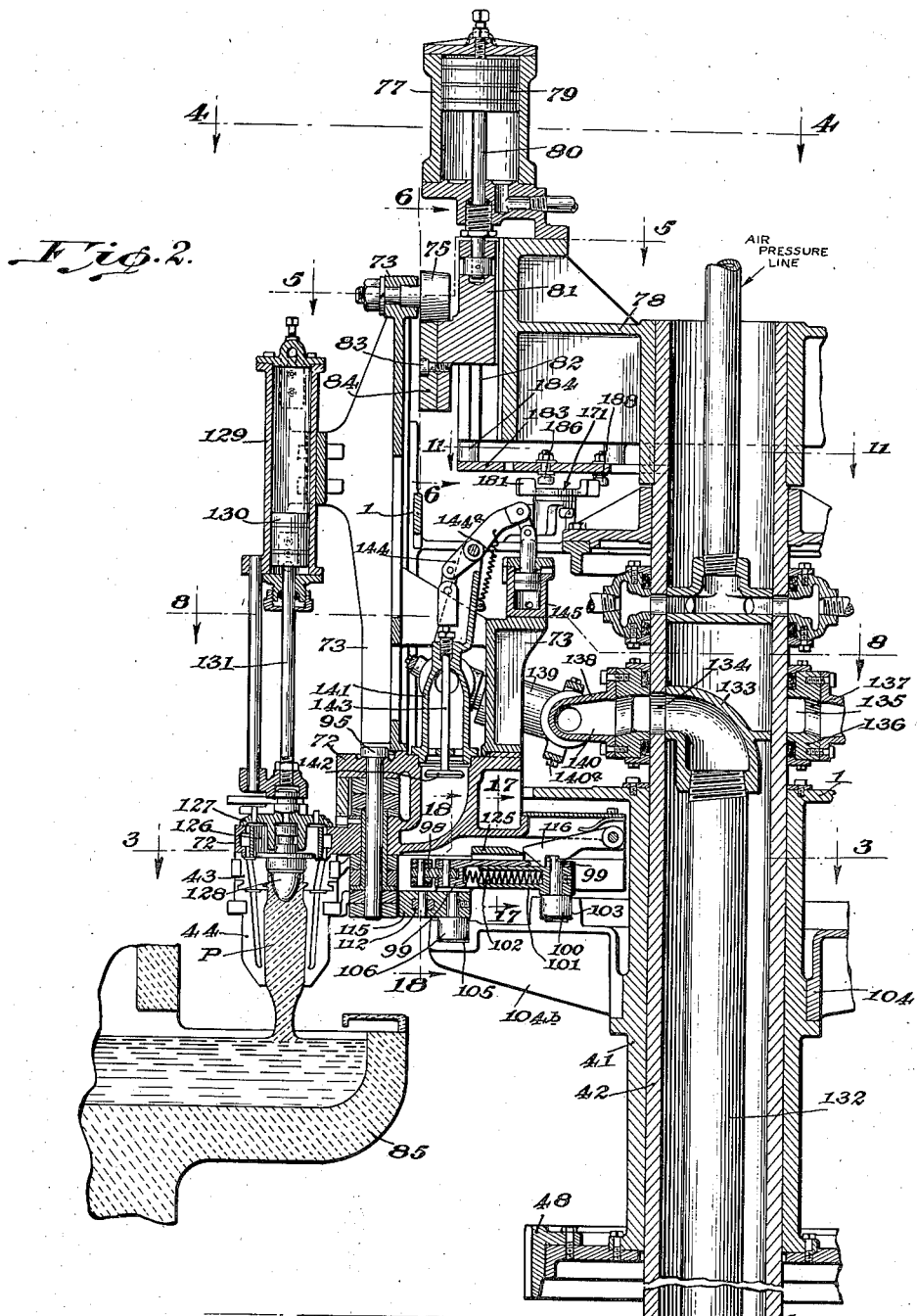

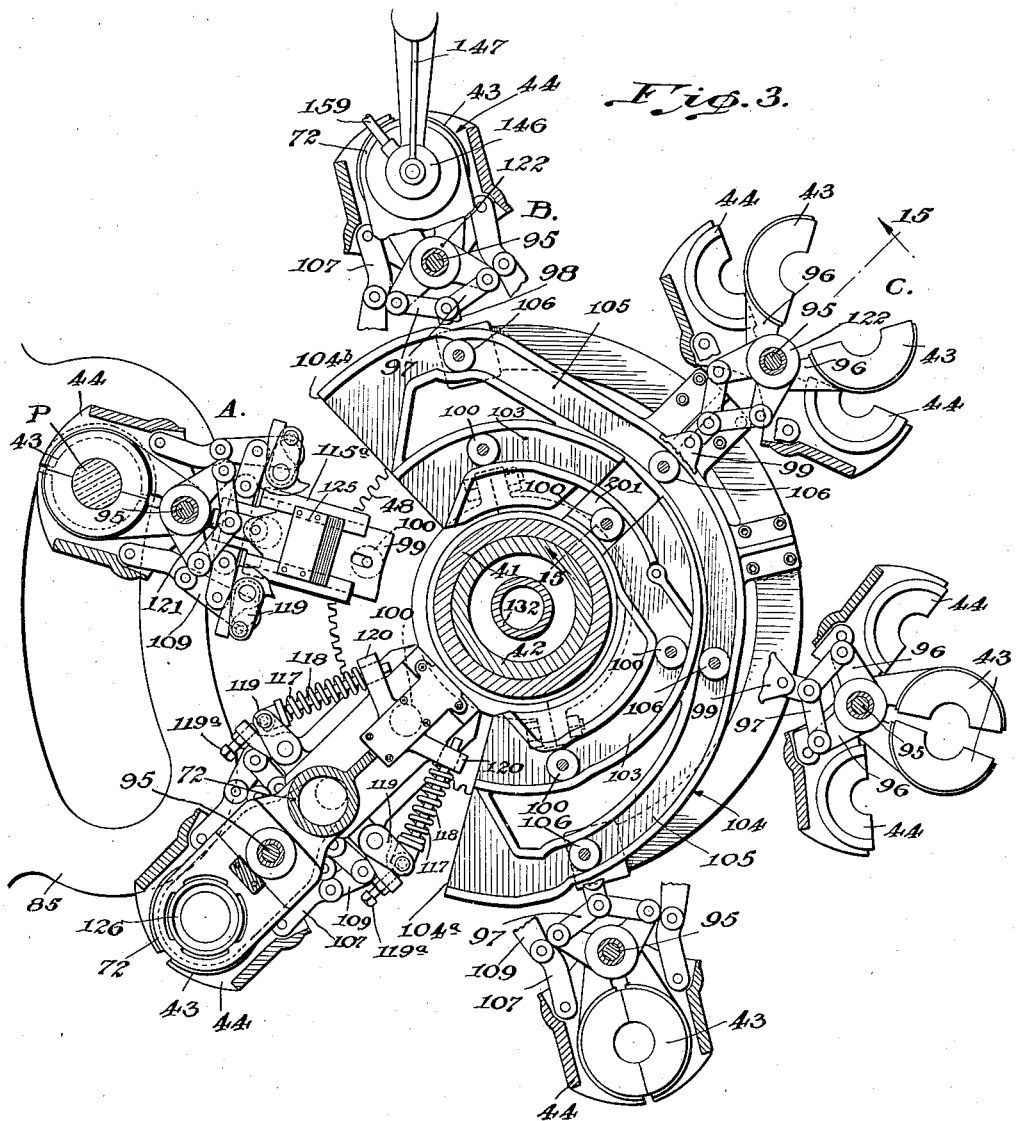

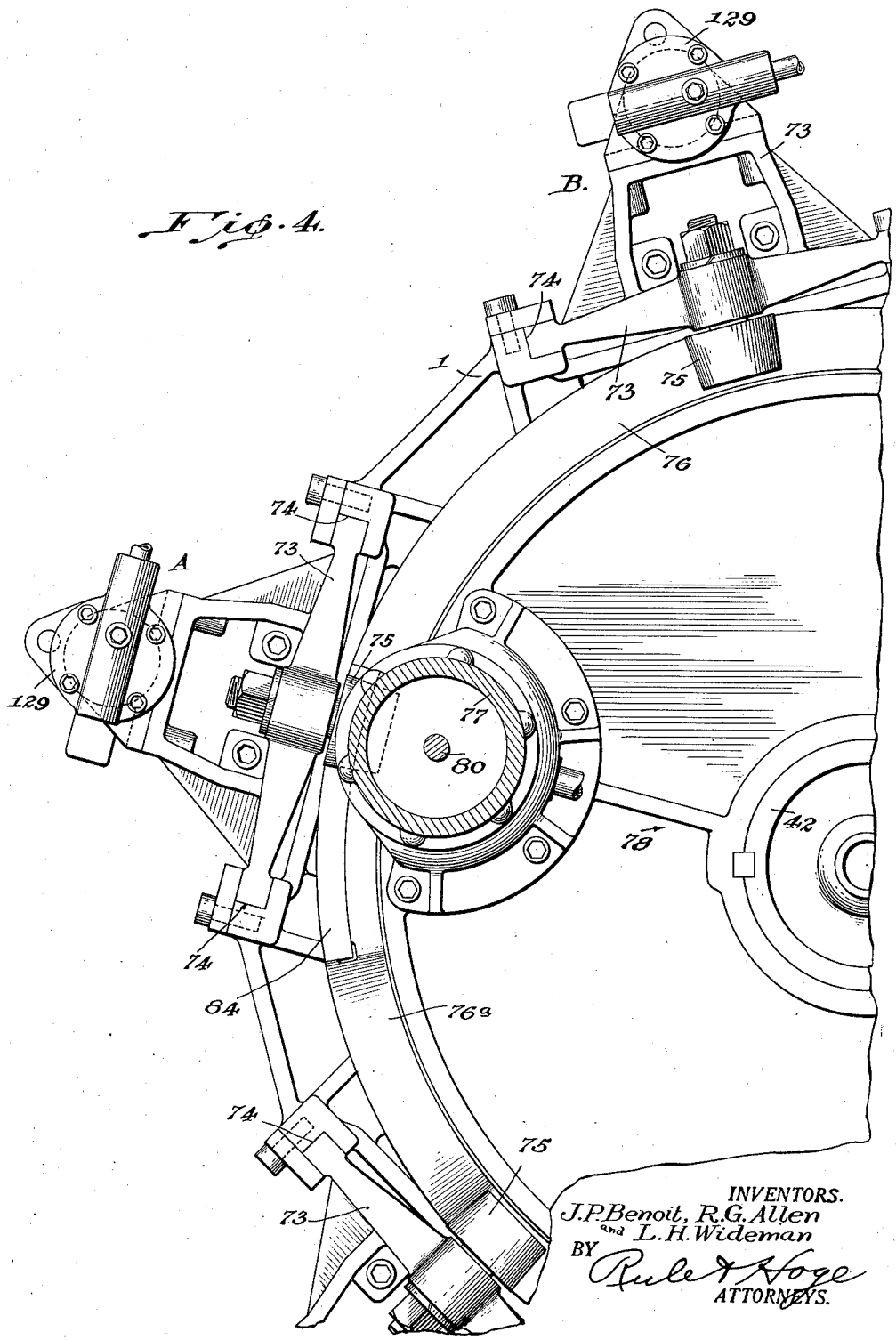

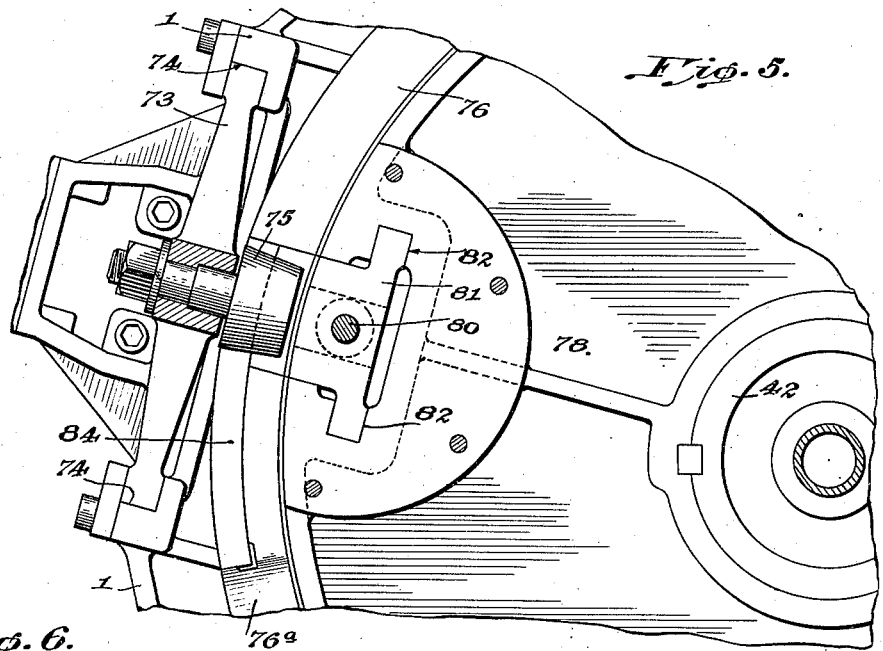
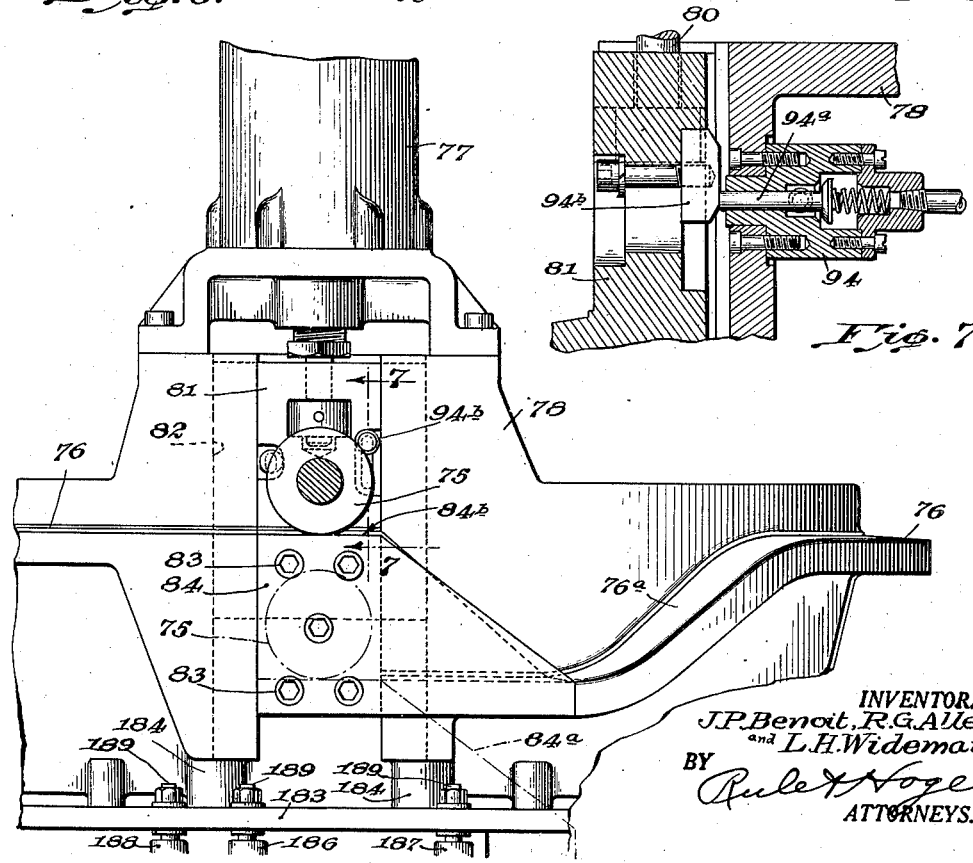

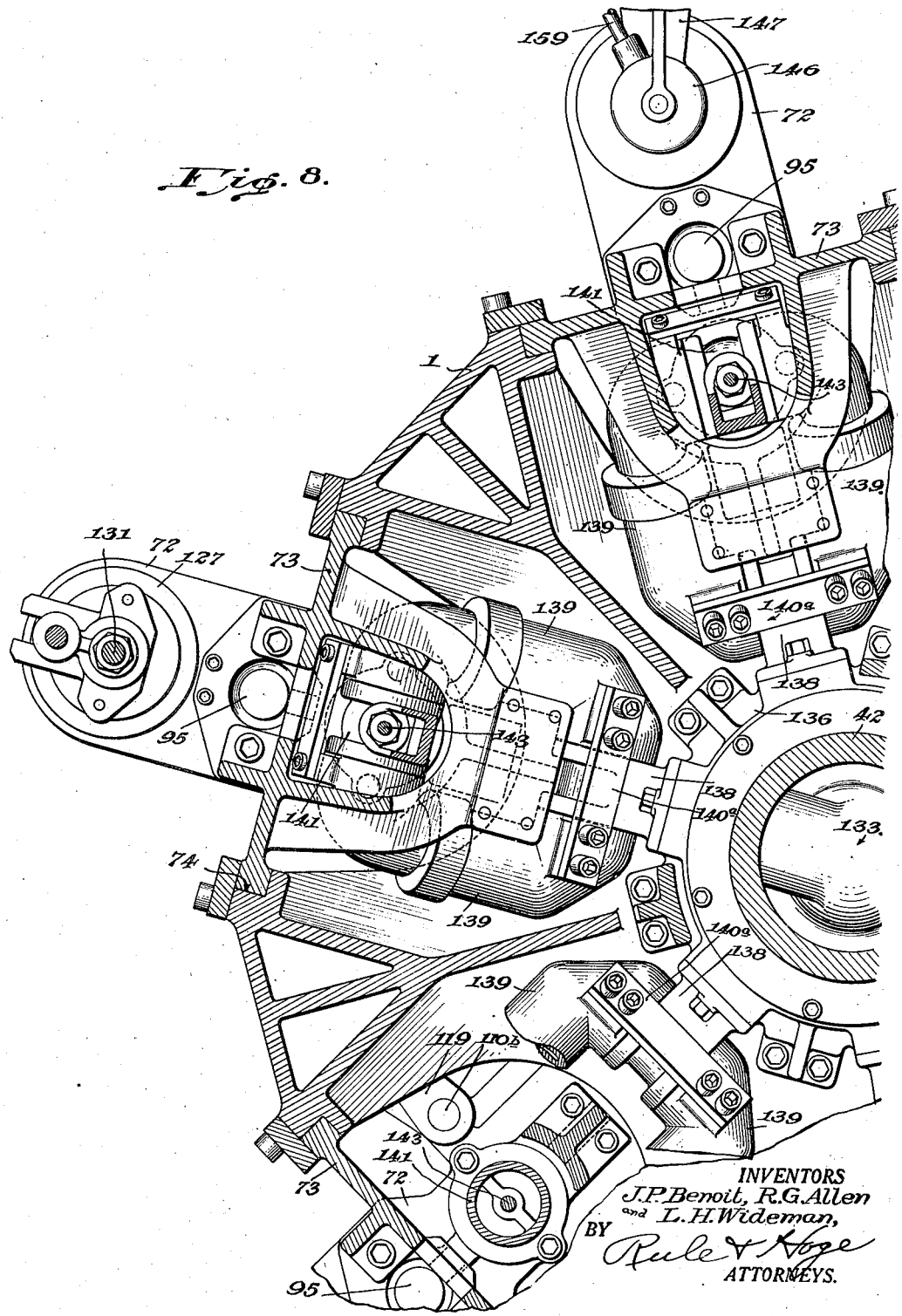

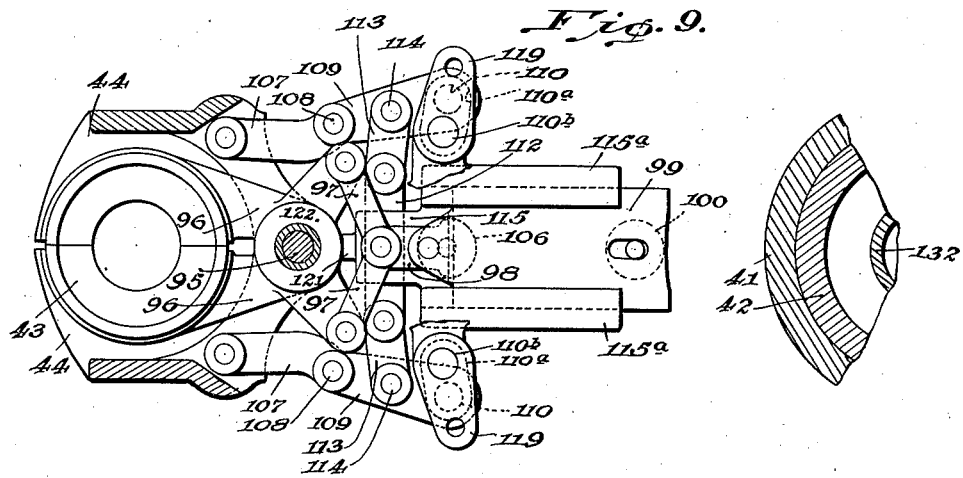
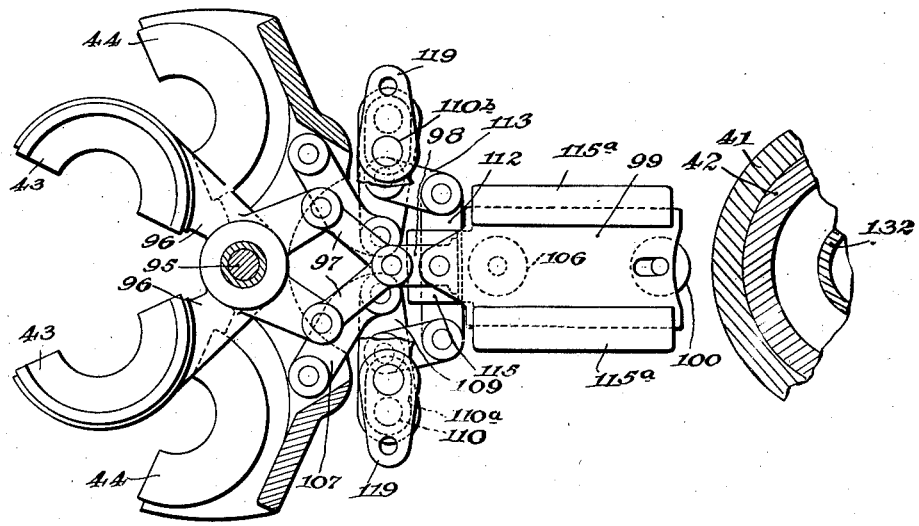

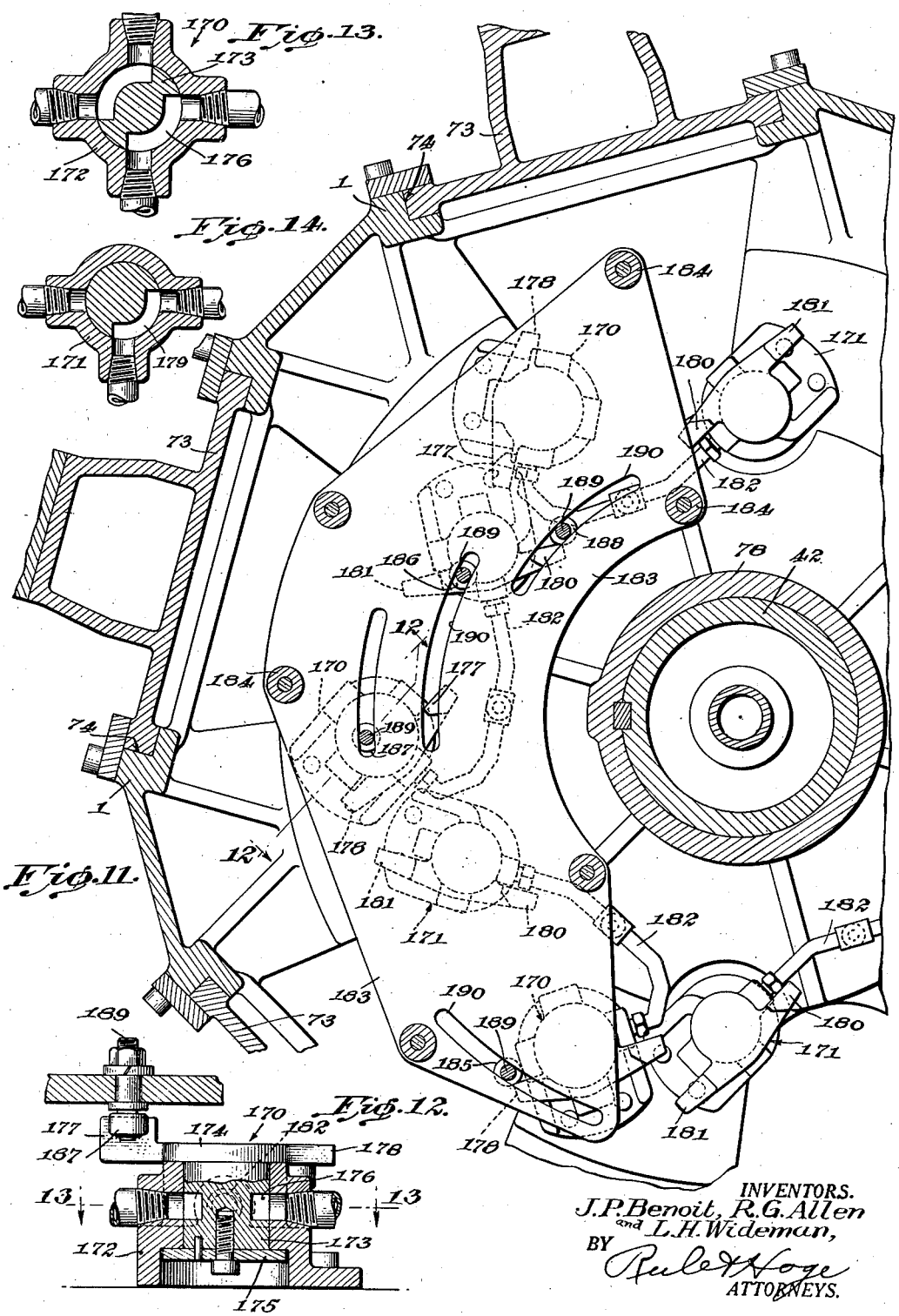

INVENTORS.
J. P. Benoit, R. G. Allen
and L. H. Wideman,
BY Rule & Hoge
ATTORNEYS.

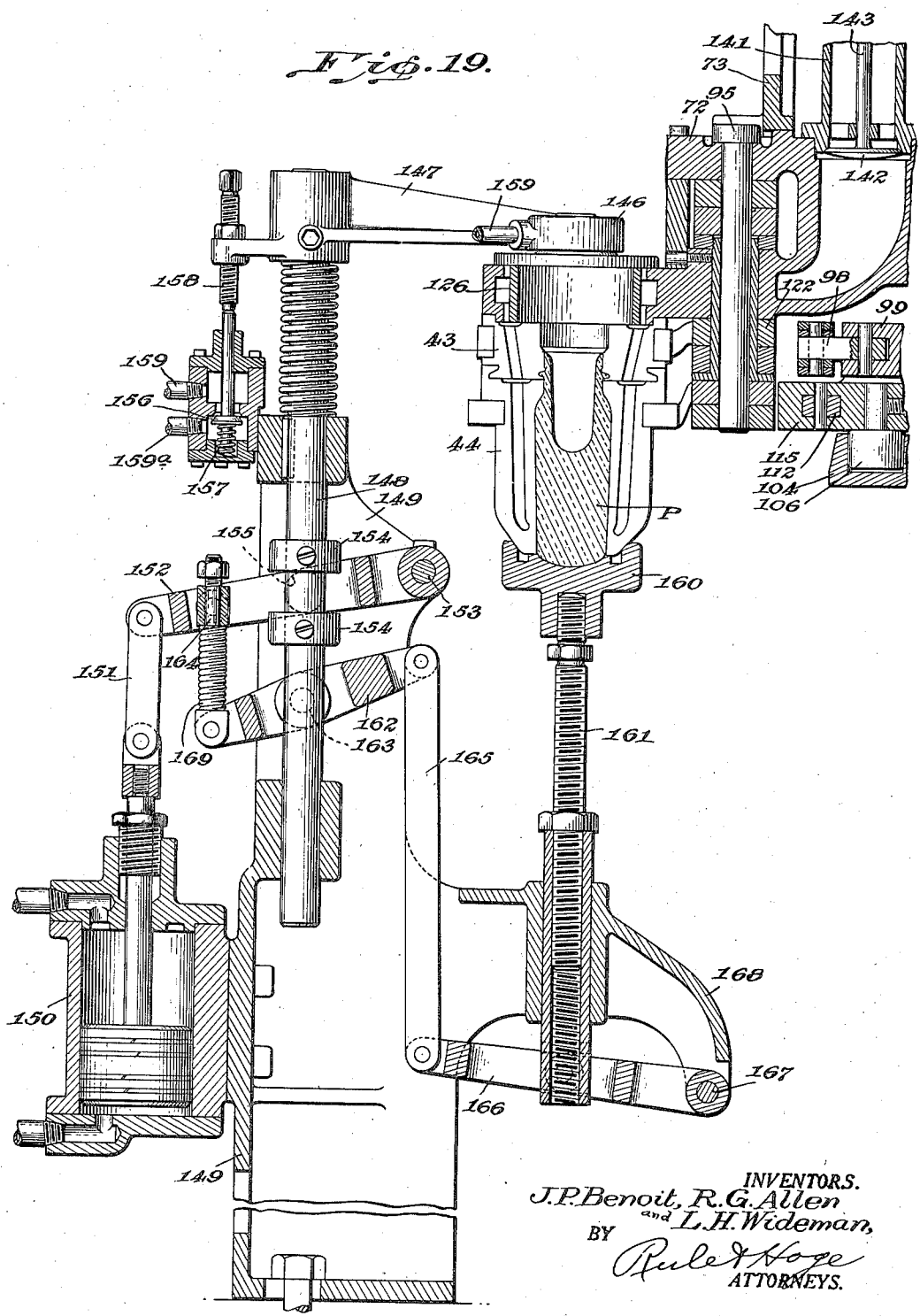

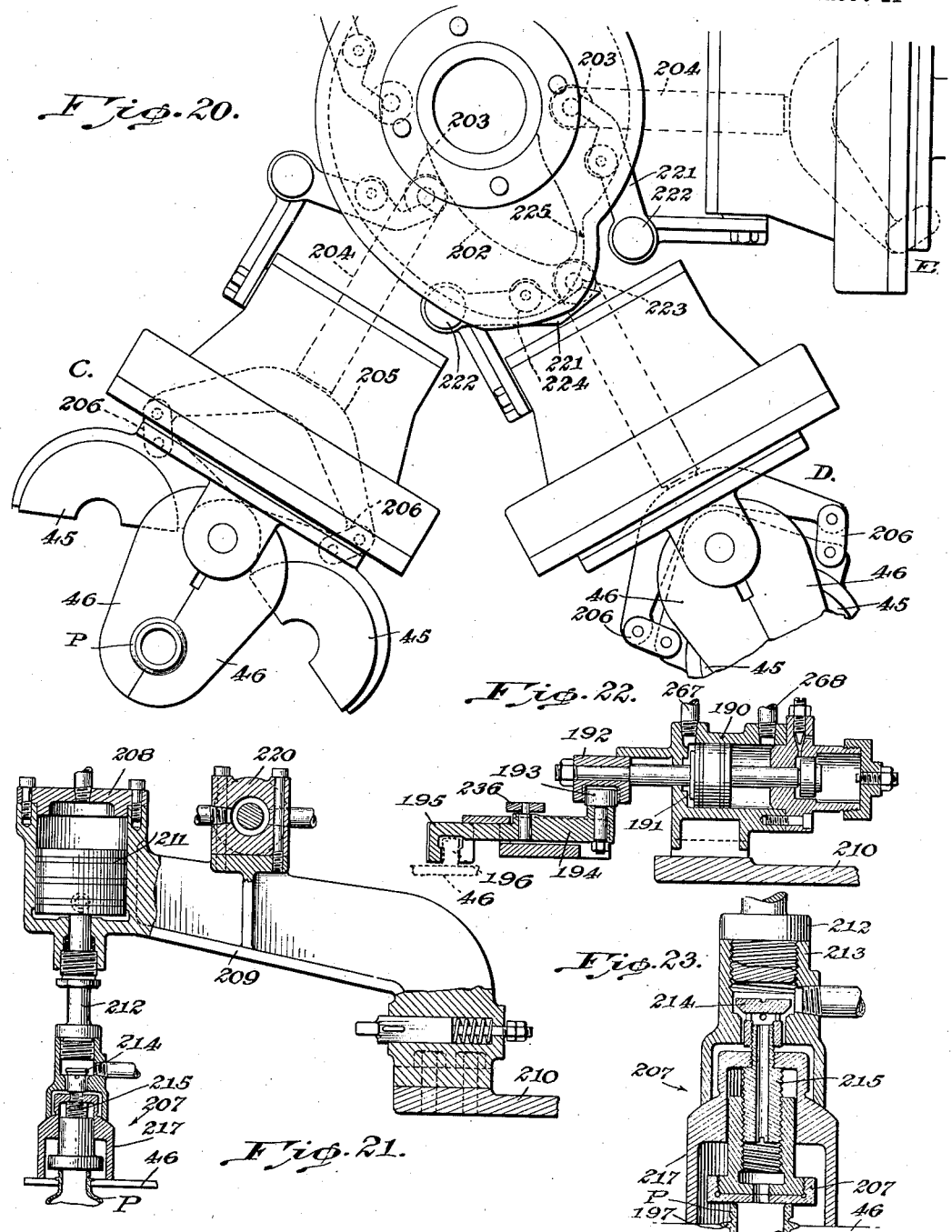

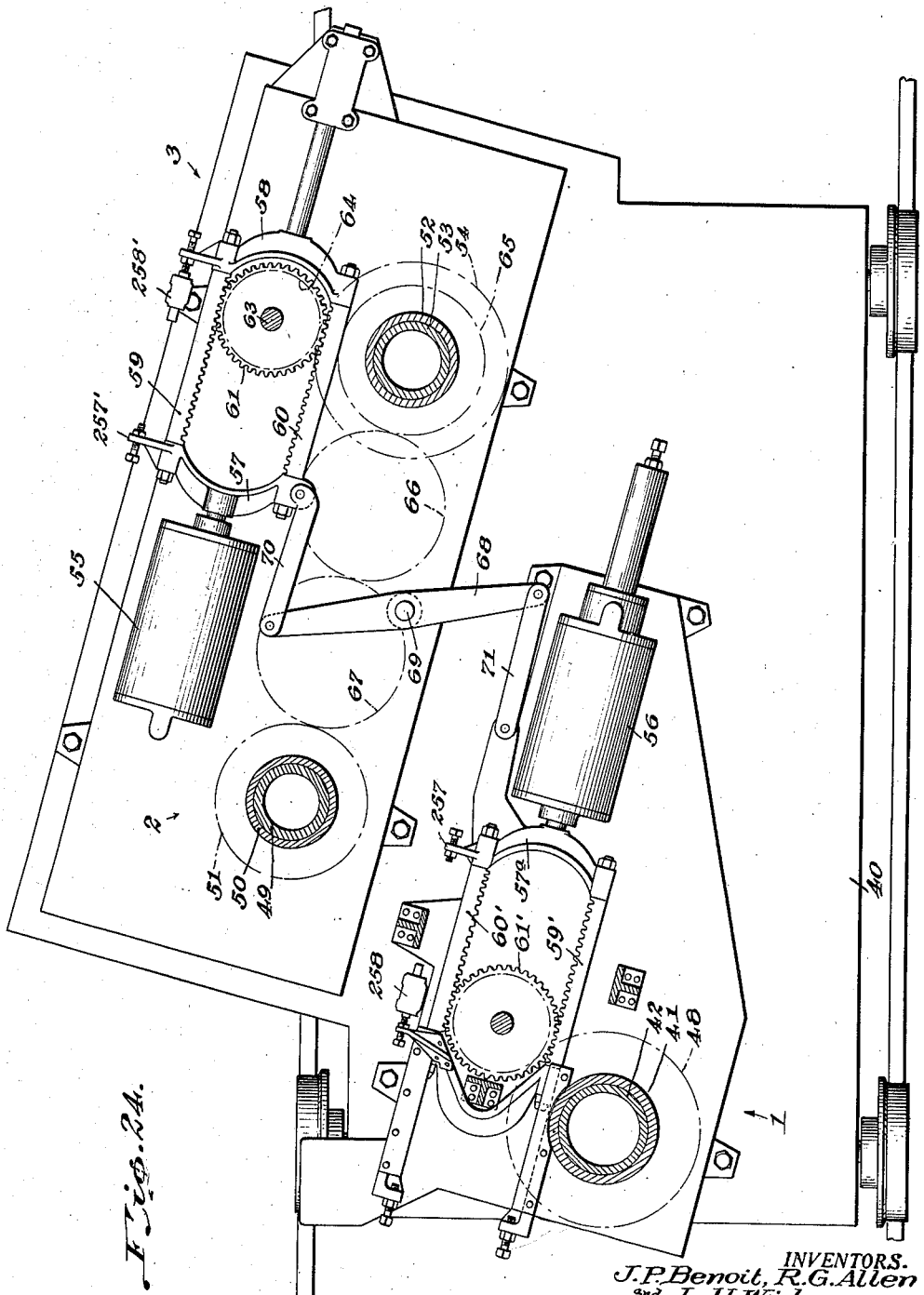

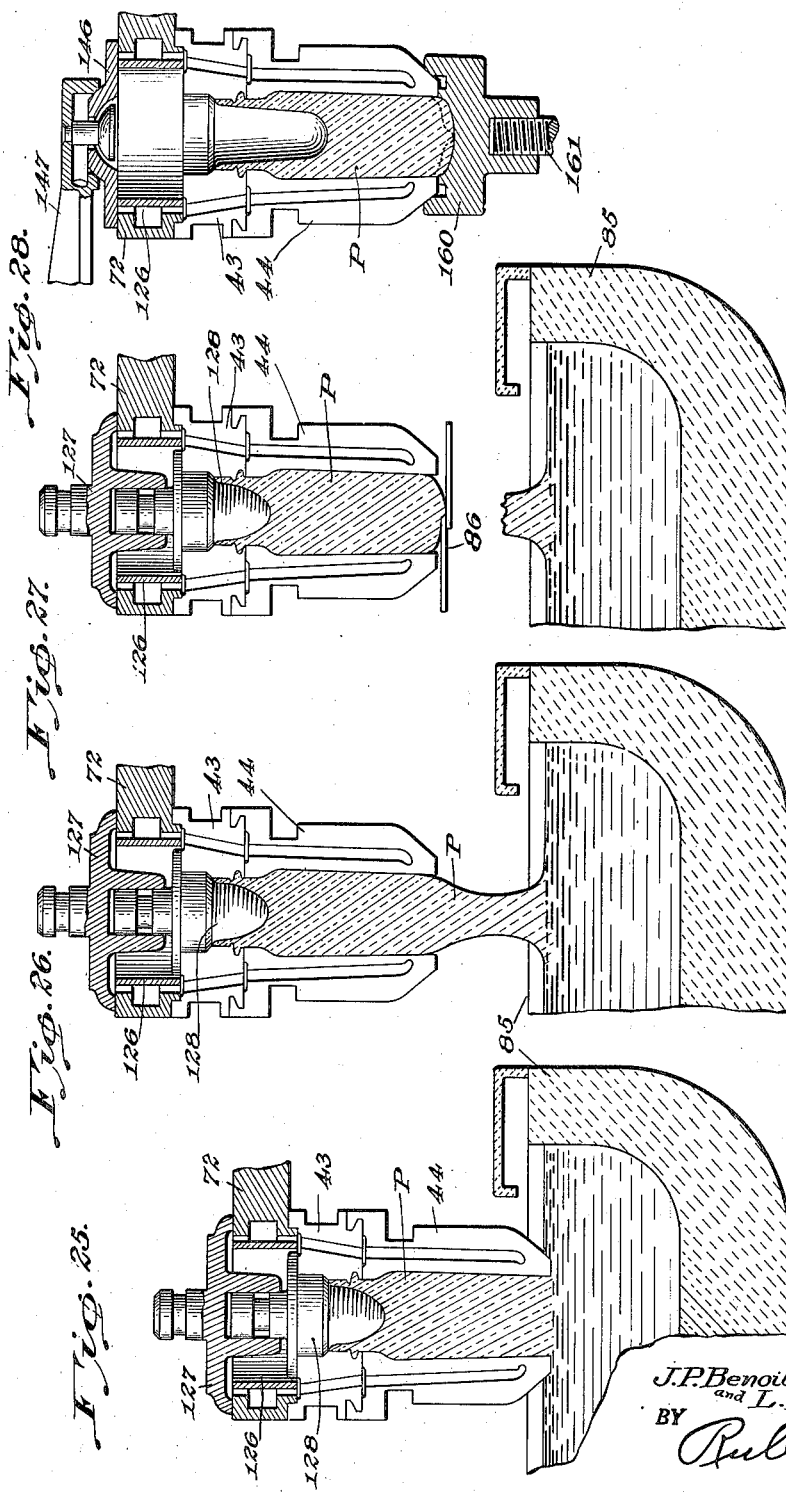

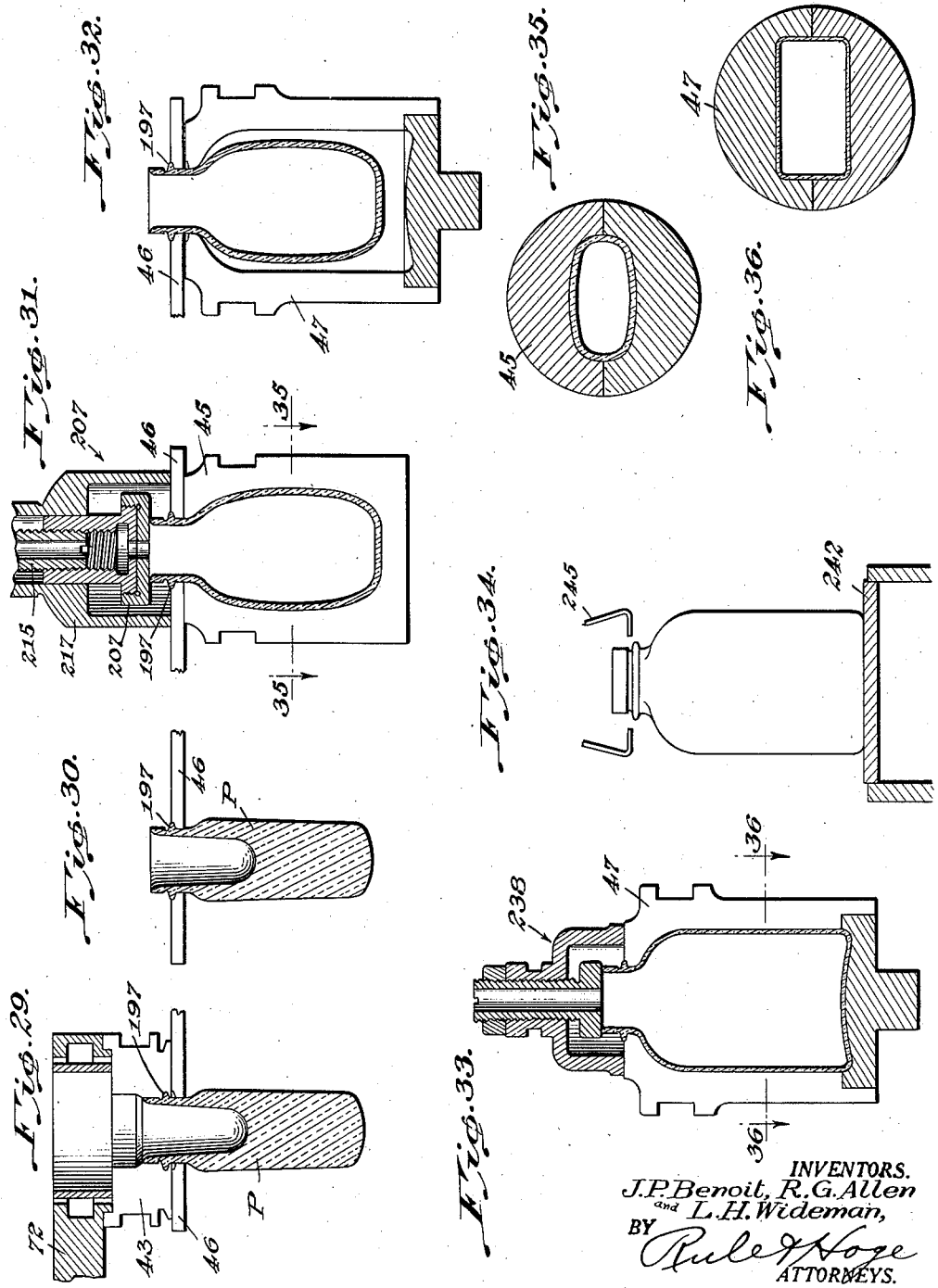

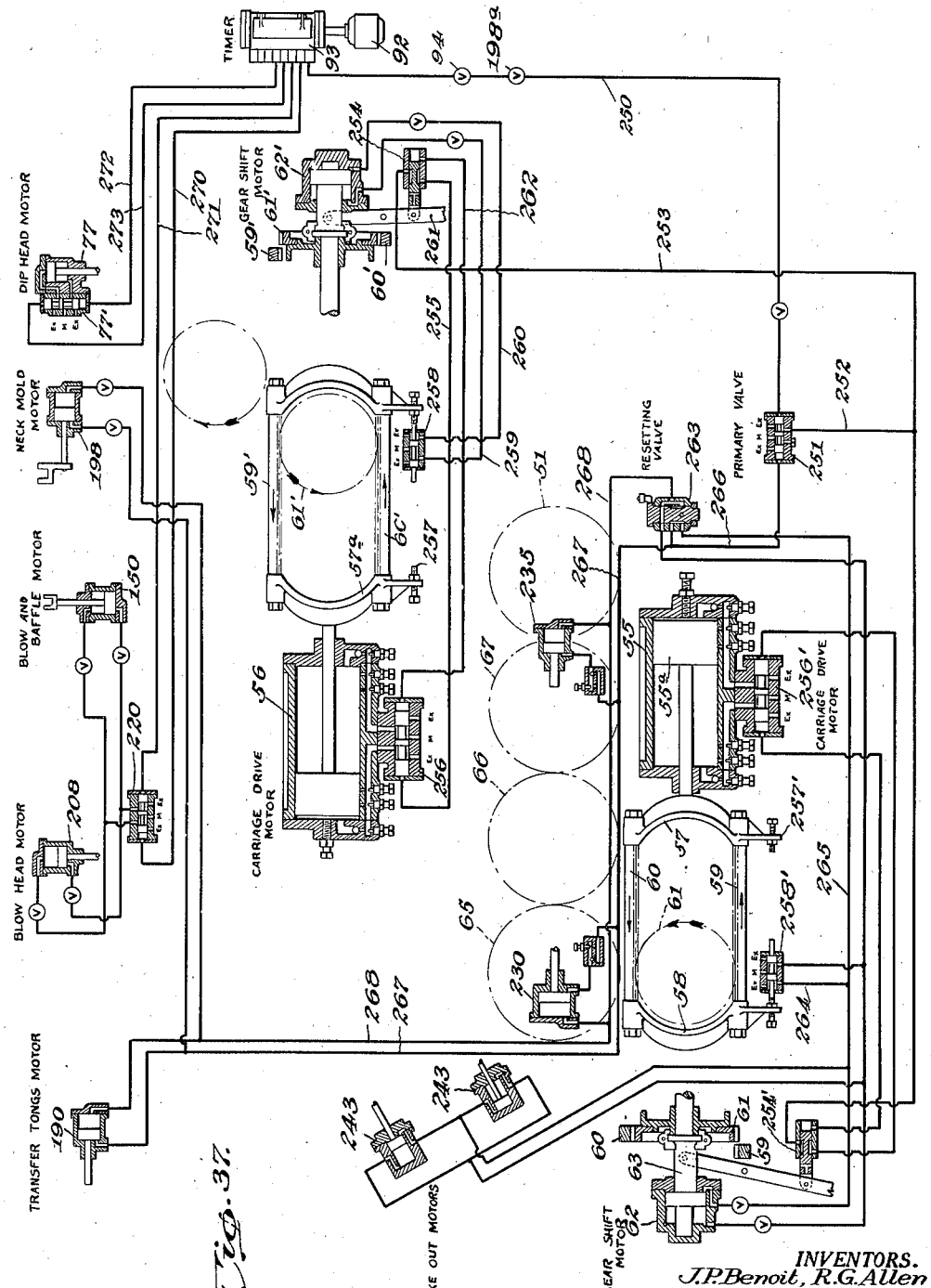

Patented Aug. 12, 1941

2,252,391

UNITED STATES PATENT OFFICE 2,252,391

GLASS BLOWING MACHINE

Joseph P. Benoit, Russell G. Allen, and Luther H. Wideman, Alton, Ill., assignors to Owens-Illinois Glass Company, a corporation of Ohio Application December 17, 1938, Serial No. 246,334

6 Claims. (Cl. 49—5)

Our invention relates to machines for blowing bottles, jars, or other hollow glass articles. More particularly, the invention relates to machines of the type in which charges of molten glass are introduced into parison molds in which they are given a preliminary formation and thereafter blown to their final shape in finishing molds.

In machines of the character indicated, difficulty is often experienced in obtaining a satisfactory distribution of the glass in the finished article, particularly certain types of bottles or the like, as, for example, panelware and other bottles of rectangular or noncircular conformation, or bottles with square shoulders or other shape conducive to uneven distribution of the glass.

An object of our invention is to provide apparatus which will insure a suitable even distribution of glass when blown in the molds, thereby overcoming such objections.

A further object of the invention is to provide a machine in which the parisons are blown in preliminary molds, thereafter blown in intermediate molds which approximate the shape of the finished articles, and thereafter blown to final form in the finishing molds.

A further object of the invention is to provide a machine of the Owens suction type wherein the charges of glass are drawn by suction into parison molds and to provide in such a machine secondary or intermediate molds to which the parisons are transferred and blown to intermediate form, and finishing molds in which they are blown to final form.

A further object of the invention is to provide novel means for transferring the article from the parison molds to the intermediate molds.

Other objects of the invention will appear hereinafter.

In the accompanying drawings:

Fig. 1 is a plan view of apparatus embodying the present invention in its preferred form;

Fig. 2 is a fragmentary sectional elevation of the blank or parison mold carriage and associated mechanism;

Fig. 3 is a section at the line 3—3 on Fig. 2;

Fig. 4 is a section on a larger scale at the line 4—4 on Fig. 2;

Fig. 5 is a section at the line 5—5 on Fig. 2, showing a dip frame and its lifting mechanism;

Fig. 6 is a vertical section of parts shown in Fig. 5, the section being taken at the line 6—6 on Fig. 2;

Fig. 7 is a section at the line 7—7 on Fig. 6, showing particularly a valve and its operating means actuated by the dip frame and controlling the indexing movements of the mold carriage;

Fig. 8 is a section at the line 8—8 on Fig. 2 showing portions of the vacuum system for applying suction within the parison molds;

Fig. 9 is a fragmentary sectional plan of a parison mold unit, including the neck mold and body blank mold, and operating means therefor, the mold being in closed position;

Fig. 10 is a similar view with the mold open;

Fig. 11 is a section at the line 11—11 on Fig. 2 showing valves and their operating mechanism for controlling the air motor which lifts and lowers the plunger, and for controlling the application of vacuum to the molds;

Fig. 12 is a section at the line 12—12 on Fig. 11 showing a valve which controls the motor for lifting and lowering the plunger;

Fig. 13 is a section at the line 13—13 on Fig. 12;

Fig. 14 is a view similar to Fig. 13 showing a vacuum controlling valve;

Figure 17:
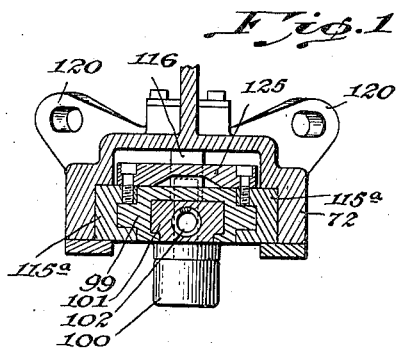
Figure 18:
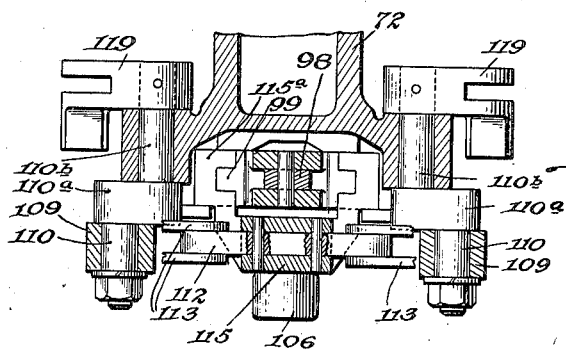

Figs. 17 and 18 are sections at the lines 17—17 and 18—18 respectively on Fig. 2, showing parts of the mold opening and closing mechanism;

Fig. 19 is a section at the line 19—19 on Fig. 1 showing means for compacting and blowing the parison in the parison mold;

Fig. 20 is a fragmentary plan view of the secondary mold carriage;

Fig. 21 is a section at the line 21—21 on Fig. 1 showing the blow-head for blowing the parisons in the secondary molds;

Fig. 22 is a section at the line 22—22 on Fig. 1 showing an air motor for closing the transfer tongs about the parison;

Fig. 23 is a sectional elevation on a larger scale of the blow-head shown in Fig. 21;

Fig. 24 is a part sectional and partly diagrammatic plan view showing the indexing mechanism for imparting step by step rotation to the mold carriages;

Figs. 25 to 33 inclusive are views showing the successive steps in the formation of a parison and its development to the form of a finished article;

Fig. 25 shows the parison mold in dip and suction applied to fill the mold;

Fig. 26 shows the mold lifted out of dip;

In Fig. 27 the shears have operated to sever the mold charge from the supply body;

In Fig. 28 the shears and plunger have been withdrawn, a baffle plate and blow-head brought into position, and air pressure applied to compact the parison in the mold;

In Fig. 29 the body blank mold and blow-head have been withdrawn and transfer arms brought into position beneath the neck mold;

In Fig. 30 the neck mold has been withdrawn, leaving the parison suspended in the transfer arms;

In Fig. 31 the secondary mold has enclosed the parison, the blow-head has been brought into position, and air pressure applied to expand the parison in the secondary mold;

In Fig. 32 the secondary mold has been replaced by the finishing mold;

In Fig. 33 the parison has been blown in the finishing mold;

Fig. 34 shows the finished article transferred to a conveyor;

Figs. 35 and 36 are sectional views at the lines 35—35 and 36—36 respectively on Figs. 31 and 33, and Fig. 37 is a diagrammatic view illustrating the carriage indexing mechanism and the timer and valves controlling the various operations, the valves and air motors being shown in section.

Referring particularly to Fig. 1, the machine comprises three mold tables or carriages 1, 2 and 3 mounted on a machine base 40 for step by step rotation about vertical axes. The parison mold carriage 1 comprises a tubular bearing member or sleeve 41 (Fig. 2) mounted for rotation about a hollow column or standard 42 rising from the machine base. Mounted on the carriage 1 are parison molds arranged in an annular series and each comprising a neck mold 43 and a body blank mold 44. The molds may be of standard construction such as is characteristic of Owens' type suction gathering machines. The mold carriage 2 has mounted thereon an annular series of secondary molds 45 and transfer arms or tongs 46, the latter adapted to support the parisons during their transfer from the neck molds 43 to the intermediate molds 45 and from the latter to the finishing molds. The finishing mold carriage 3 carries a series of finishing molds 47 to which the parisons are transferred from the intermediate molds 45 and in which they are blown to finished form.

Attached to the lower end of the sleeve 41 (Fig. 2) is a ring gear 48 through which power is transmitted for rotating the carriage 1. The intermediate mold carriage 2 is mounted on a column 49 (Fig. 24) and comprises a bearing sleeve 50 to which is attached driving gear 51. The carriage 3 in like manner includes a bearing sleeve 52 journalled on a column 53 and having attached thereto a driving gear 54. The carriages are driven by air motors 55 and 56 (Figs. 24 and 37). The mechanism for driving the mold carriages may be of conventional construction such as shown, for example, in the patent to Bridges, 2,049,422, to which reference may be had for a detailed description of such mechanism and its operation.

The piston of the motor 55 is connected by means of yokes 57 and 58 to an upper rack 59 and a lower rack 60 which are brought alternatively into mesh with a gear 61 by lifting and lowering the gear. Shifting of the gear is effected by an air motor 62 (Fig. 37). The gear 61 is shifted at the end of each stroke of the motor piston 55$^a$ so that the gear is always rotated in the same direction. The gear 61 is mounted on a shaft 63 on which is also mounted a gear 64 running in mesh with the gear 54 so that rotation of the gear 61 imparts rotation to the mold carriage 3. This motion is transmitted to the secondary mold carriage 2 through a train of gears 65, 66, 67 and 51.

The air motor 56 has driving connection with the mold carriage 1 through rack and gear mechanism which is substantially a duplicate of that above described. The two mechanisms are tied together by means of a lever 68 fulcrumed at 69 and connected through links 70 and 71 to the yokes 57 and 57$^a$. It will be seen that with this construction, the motor 55 has a positive driving connection with all of the mold carriages. The same is true of the motor 56 which serves as a booster to supplement the motor 55.

Referring to Figs. 1 to 4, the parison molds are mounted on dip heads 72 individual to the molds, each dip head being vertically movable on the carriage for lowering and lifting its mold into and out of dip. Each dip head is carried by a vertically disposed dip frame 73 mounted to slide up and down in guides 74 on the carriage. Each dip frame carries at its upper end a roll 75 which runs on an annular track 76. The dip frames are under the control of an air motor 77 mounted on a stationary bracket 78 keyed to the center column 42. The motor 77 comprises a piston 79 and piston rod 80, the latter connected to a head 81 (Figs. 2, 5 and 6) mounted to slide in vertical guideways 82 in the bracket 78. The head 81 has attached thereto by screws 83, a plate 84.

The track 76 has an inclined section 76$^a$ down which the roll 75 runs as the dip frame and mold approach the gathering station, the dip head being lowered by gravity under the control of said inclined track section. The piston 79 is at this time in its lowered position so that the plate 84 is lowered to the broken line position 84$^a$ (Fig. 6) and the upper horizontal surface 84$^b$ of the plate is in alignment with the end of the track 76 which is interrupted at the guideway for the head 81. This permits the roll 75 to run onto the plate 84 as indicated in broken lines (Fig. 6). When this position is reached, the rotation of the mold carriage is stopped, the mold being now in its lowered position (Fig. 25) in sealing contact with the pool of molten glass in the container 85. Suction is now applied to exhaust the air from the mold cavity and draw a charge of glass into the mold. The motor piston 79 is then lifted, thereby lifting the plate 84 and with it the dip frame so that the mold is lifted out of dip as shown in Fig. 2. A pair of shears 86 then operates to sever the glass directly beneath the mold.

The shearing mechanism may be of any approved construction and does not in itself form a part of the present invention. Said mechanism as shown in Fig. 1 comprises a pair of shear arms interconnected by gear segments 88. The shears are separated by a cam operated lever 89 operating through connections 90 to one shear arm, the shears being moved to closed position by a spring 91. The cam is actuated by an electric motor 92 geared thereto. A timer 93 (Figs. 1 and 37) is also driven by the motor 92.

Referring to Fig. 7, a safety valve 94 is mounted on the bracket 78. The valve stem 94$^a$ projects into the path of a cam block 94$^b$ attached to the head 81. When the dip head is lifted, the cam engages the valve stem and opens the valve as shown in Fig. 7. The valve is connected in the pressure line 250 (Fig. 37) which, as hereinafter described, controls the indexing of the mold carriages. Such indexing takes place while the dip head is in its lifted position. When the dip head is lowered, the cam 94b disengages the valve so that the latter is closed and prevents indexing of the mold carriages.

The parison mold (see Figs. 2, 3, 9 and 10) may be of conventional construction including the body blank mold 44 and neck mold 43, each comprising partible sections mounted to swing about a hinge pin 95. The neck mold sections are carried on arms 96 operated through a pair of links 97 pivotally connected to said arms and to a link 98, the latter being pivoted to a slide plate 99. A cam roll 100 (Fig. 2) is carried on a tubular rod or member 101 mounted to slide in the plate 99, and yieldingly held in its extended position by a coil spring 102 mounted therein. This construction permits the neck mold to be held closed with a yielding pressure. The cam roll 100 runs in a cam track 103 on a stationary cam plate 104 mounted on the sleeve 41, said cam track being shaped to effect the opening and closing movements of the neck mold.

The opening and closing movements of the body blank mold 44 are controlled by a cam track 105 formed on the cam plate 104. Operating connections between the mold sections 44 and cam rolls 106 running in the track 105, include links 107 pivoted at their forward ends to the mold sections and connected at their opposite ends by pivot pins 108 to links 109. The links or arms 109 are pivotally connected by stud shafts 110 (Figs. 9, 18) to rock arms 110a fixed to the lower ends of rock shafts 110b journalled in the dip head frame 72. A cross-bar or yoke 112 is connected through links 113 to the arms 109 by pivot pins 114. The cross-bar 112 extends through a slide-block 115 which carries the cam roll 106. When the cam roll 106 is moved radially outward, carrying with it the yoke 112, the latter operates through the links 113 to swing the arms 109 and 107 to the Fig. 9 position, thereby closing the mold 44. The slide-block 115 (see Figs. 15, 18) is extended upward and shaped to provide a pair of rails 115a which provide guideways for the slide plate 99.

Referring to Fig. 3, the cam plate 104 is cut away between the radial lines 104a and 104b to permit lowering of the dip frame while it traverses the gathering station. In order to hold the neck mold closed while beyond the control of the cam track 103, a latch 116 (Fig. 2) is pivoted on the dip frame in position to drop over the pivot pin of the roll 100, thereby holding the slide-block 99 in its outward position with the neck mold closed.

The body blank mold 44 is held closed while out of the control of its cam 105, by means including a pair of coil springs 117 (Fig. 3) mounted on rods 118 pivotally connected to rock arms 119 keyed to the upper ends of the rock shafts 110b (see Fig. 18). The springs 117 are held under compression between the arms 119 and arms 120 on the dip frame. The slide block 115 is provided at its outer end with a lug 121 (Fig. 9) which when the mold 44 is closed abuts the hubs 122 of the mold arms and prevents outward movement of the slide-block beyond its mold closing position. When the mold is closed, the springs 117 being under compression, react through the rock arms 119 and rock shafts 110b to apply outward pressure against the links 109, 107, thereby holding the molds closed with a yielding pressure.

Adjustable stops 119a limit the outward movement of the arms 119.

The latch 116 which holds the neck mold closed is released when the body mold 44 opens, by means of a cam block 125 (Figs. 2, 3 and 17) mounted on the rails 115a of the slide-block 115. As the slide-block moves rearwardly during the opening of the finishing mold, the cam engages beneath the latch 116 and lifts it to inoperative position.

Each dip head is provided with an air and vacuum chamber 126 (Figs. 2 and 25) which is directly over and in register with the neck mold when the latter is closed. Each unit comprises a head plate 127 adapted to seat on the dip head and close the chamber 126. The plate 127 carries a plunger 128 extending into and through the neck mold to form an initial blow opening in the parison. An air operated piston motor 129, herein referred to as a plunger motor, is mounted on each dip frame and comprises a piston 130 and piston rod 131, the latter connected at its lower end to the plate 127.

The vacuum system comprises a vacuum pipe 132 (see Fig. 2) extending upwardly within the hollow standard 42 and provided at its upper end with an elbow 133 communicating through a port 134 in the standard 42, with an annular chamber 135 in a collar 136 surrounding the standard 42 and connected to rotate with the mold carriage. The chamber 135 opens through ports 137 into hollow castings or caps 138 individual to the dip heads. A pair of U-shaped pipes 139 (Figs. 2 and 8) are pivotally mounted on opposite sides of the cap 138 to swing up and down and are open to the interior of the cap through ports 140. Straps 140a secure the pipe sections 139 together and in position on the cap 138. The outer ends of the pipe sections 139 have a similar pivotal connection with a valve casing 141.

A vacuum valve 142 has a stem 143 extending upwardly through the valve casing and operatively connected with one arm of a lever 144, the other arm of which is connected to the piston rod of an air motor 145. When air pressure is supplied at the lower end of the air motor 145, it operates to lower the valve 142, thereby opening the vacuum line which extends to the chamber 126 so that the air is exhausted from the mold while the latter is in dip and a charge of glass drawn by suction into the mold (Fig. 25). When the mold has thus received its charge, the motor 77 operates to lift the dip head as shown in Figs. 2 and 26. The shears 86 then operate to sever the charge (Fig. 27). Thereafter, the motor 129 operates to lift the plunger, withdrawing it from the mold. The mold carriage is also indexed to advance the dip head and molds from station A to station B.

At station B the parison P receives a puff of air and is compacted within the mold by mechanism shown in Fig. 19. Said mechanism includes a blow-head 146 (Figs. 19, 28) carried on an arm 147, the latter secured to the upper end of a vertical rod 148, said rod being mounted for up and down sliding movement in a stationary standard 149 which may be secured to the machine base. When a mold is brought to rest at station B it is directly beneath the blow-head 146. The latter is moved down to seat upon the chamber 126 by means of an air operated piston motor 150. The motor piston is connected through a link 151 to one end of a lever 152, the other end of which is fulcrumed at 153 to the standard 149. Collars 154 on the rod 148 engage a roll or rolls 155 on the arm 152, providing an operating connection by which the movement of the lever 152 is transmitted to the rod 148.

Air under pressure is supplied to the blow-head 146 under the control of a valve 156. The valve is normally held closed by a coil spring 157. When the blow-head 146 is lowered, a valve operating rod 158 adjustably mounted on the arm 147, is moved downward into engagement with the valve stem and unseats the valve, thereby permitting air under pressure to be transmitted from the valve through a pipe 159 to the blow-head. A supply pipe 159a extends from the valve directly to the main pressure line.

A mold bottom or baffle plate 160 on the upper end of a vertical rod 161 movable up and down in the frame 149, is also actuated by the piston motor 150. The operating connections between the motor and plate 160 include a lever 162 fulcrumed at 163 on the standard 149. One end of the lever 162 is connected through a rod 164 to the lever 152. The other end of the lever 162 is connected through a link 165 with the free end of a lever 166 fulcrumed at 167 to a bracket 168 on the standard 149. The lever 166 is operatively connected to the rod 161. It will be seen that with the connections just described, when the motor piston is lowered to seat the blow-head 146, it operates at the same time to lift the baffle plate 160 and seat it on the lower end of the mold. A coil spring 169 mounted on the rod 164, is placed under compression by the downward movement of the motor piston and serves to hold the plate 160 against the mold with a yielding pressure.

The valve mechanism for controlling the plunger motors 129 and the motors 145 for actuating the vacuum valves will now be described. Referring to Figs. 2 and 11 to 14, each head or unit comprises a valve 170 controlling the plunger motor 129 and a valve 171 controlling the valve operating motor 145. Each valve 170, as shown in Figs. 12 and 13, comprises a valve casing 172 in which is journalled a core 173, the latter having top and bottom plates 174 and 175 which engage bearing faces formed on the valve casing. The valve as shown is a four-way valve, the core being formed with channels 176 to communicate with port openings in the valve casing. The plate 174 is provided with lugs 177 and 178 which, as the valve travels with the mold carriage, are adapted to be engaged by stationary rolls as hereinafter described for actuating the valves.

The valve 171 is of similar construction to the valve 170 except that it is a three-way valve having only a single channel 179 formed in the core thereof. The valve 171 is provided with lugs 180 and 181 corresponding to the lugs 177 and 178 on the valve 170. The valves 170 and 171 are mounted in pairs on the mold carriage, each pair being connected by a pipe 182 through which air under pressure is conducted to the valves.

Just above the path of the valves 170 and 171 is a stationary horizontal plate 183 (Figs. 2 and 11), said plate being secured to the bracket 78 and spaced therebelow by means of spacing blocks 184. Mounted on the under side of the plate 183 are rolls 185, 186, 187 and 188 for actuating the valves as will presently be described. Said rolls are mounted on stud bolts 189 adjustable in slots 190 in the plate 183 to permit adjustment of the times at which the plungers are lifted and lowered and the application and cutting off of the vacuum in the molds.

The operation of the valves 170 and 171 will be described in connection with the pair of valves beneath the lower end of the plate 183 as viewed in Fig. 11. As here shown, the valve 170 has reached a position to be operated by the roll 185 which engages the lug 178 and rotates the valve into position to supply air pressure to the upper end of the corresponding plunger motor 129 and lower the plunger. As the carriage advances, the valve 171 is next actuated by the roll 187 engaging the lug 181 and rotating the valve into position to supply air to the motor 145 and thereby lower the vacuum valve 142. This takes place after the mold has been lowered into dip so that suction is applied for filling the mold. As the mold carriage advances, the mold is lifted out of dip and the glass severed as heretofore described. The vacuum valve 171 is then operated by the roll 188 engaging the lug 180 to cut off the air supply to the motor 145 and permit a spring 144a to lower the motor piston and close the vacuum valve 142, thereby cutting off the suction from the mold. Thereafter, the roll 186 engages the lug 177 of the valve 170 and actuates the latter to cut off the air pressure at the upper end of the plunger motor 129 and supply pressure to the lower end beneath the piston so that the plunger is lifted, thus completing the cycle of operations controlled by the pair of valves 170 and 171.

After the compacting and blowing of the parison at station B (as shown in Fig. 19), the mold carriage 1 is indexed to advance the parison to the transfer station C. During this indexing of the carriage the body mold 44 is opened by its cam 105 so that the bare parison is suspended from the neck mold 43 by the time it reaches the transfer station. The transfer arms or tongs 46 are now swung to closed position to engage the parison directly beneath the neck mold (see Fig. 29). This closing of the transfer tongs is effected by means of an air motor 190 (Figs. 1 and 22) having a stationary mounting on a platform 210 above the mold carriage 2, said motor comprising a cylinder and a piston 191 which reciprocates radially of the mold carriage 2. The outer end of the piston rod carries a connecting head 192 which engages rolls 193 carried on slide plates 194 individual to the secondary mold units. The outer end of the slide plate 194 is formed with a yoke or connector 195 adapted to engage pins 196 on the transfer arms 46. When the motor piston is moved radially outward to the Fig. 22 position, it operates through the connections just described to close the transfer arms or tongs.

The neck mold is next opened, leaving the bare parison supported by the transfer tongs (Fig. 30). The neck mold is shaped to form an annular flange or shoulder 197 on the neck of the parison. When the neck mold opens, the parison drops a short distance and is arrested by said shoulder engaging the tongs 46. The opening movement of the neck mold is effected by an air operated piston motor 198 (Figs. 15, 16) which has a stationary mounting beneath the mold carriage 1. The piston rod 199 is movable radially of the mold carriage 1 and is attached to a slide plate 200 formed integral with a movable section 201 of the cam track 103. The cam roll 100 which, as heretofore described, is operatively connected to the neck mold, enters the section 201 as the mold carriage comes to rest with the parison at the transfer station. The motor 198 then operates to open the neck mold as above noted.

A safety valve 198ᵃ (Fig. 15) is actuated by the piston rod 199 when the latter is moved inward to open the neck mold, the piston rod operating through an arm 198ᵇ to open the valve. The valve is in the pressure line 250 (Fig. 37) which controls the carriage indexing motors, so that if the motor 198 fails to open the neck mold, the valve 198ᵃ remains closed and the mold carriages cannot be indexed.

The mold carriages are now indexed to advance each mold another step, thereby bringing the parison while supporting in the transfer tongs to the blowing station D. During this indexing movement the secondary mold 45 is closed around the parison. This closing movement is effected by a stationary cam 202 (Fig. 20) on which runs a cam roll 203 on the inner end of a radial arm 204. The outer end of said arm carries a yoke 205 connected through links 206 to the mold arms.

When the parison is thus enclosed in the secondary mold at station D, a blowing head 207 (Figs. 21, 23 and 31) is moved downward and seats on the parison. The blowing head is lifted and lowered by means of a piston motor 208 carried on a bracket 209 mounted on the stationary platform 210, which may be carried on the column 49. The motor 208 includes a piston 211 and piston rod 212. To the lower end of said rod is attached a tubular member 213 providing a valve chamber in which is a valve 214. The valve stem 215 comprises sections having a screw-threaded connection for adjusting the length of said stem. The blow-head 207 on the lower end of said stem is adapted to seat on the parison. A floating hood 217 surrounding and enclosing the blow-head 207 is adapted to seat on the transfer arms 46 (Fig. 31). Seating of the blow-head 207 on the parison automatically opens the valve 214, permitting air pressure to be transmitted through the hollow valve stem for blowing the parison in the secondary mold 45. A valve 220 mounted on the bracket 209 controls the supply of air to the motor 208, said valve in turn being controlled by the timer 93 as hereinafter described.

After the parison has been blown in the secondary mold, the blow-head 207 is withdrawn. The carriages are then indexed so that the parison is advanced from station D to a second transfer station E. During this indexing movement the secondary mold is opened by mechanism shown in Fig. 20. Such mechanism includes arms 221 individual to the mold units, each said arm pivoted at 222. The free end of the arm extends into position to engage the pin 223 on which the cam roll 203 is mounted. As the mold advances from station D to station E, a cam roll 224 carried on the arm 221, runs on a stationary cam track 225 so shaped that it swings the arm 221 inwardly about its fulcrum 222 and thereby causes said arm to draw the rod 204 inwardly and open the secondary mold 45. The parison is now at the second transfer station E and supported solely by the transfer arms 46.

The finishing molds 47 may be opened and closed by any approved mechanism. Referring to Fig. 1, there is shown mechanism for this purpose similar to that disclosed in detail in the above noted patent to Bridges 2,094,422. Such mechanism includes a piston motor 230, the piston rod of which is attached to a connector 231 adapted to engage cam rolls 232 individual to the finishing molds. Each said cam roll is carried on a yoke 233 connected to the mold sections. When the parison has been brought to the transfer station E as above described, the connector 231 is in operative relation to the cam roll 232 of the open finishing mold at said station. The motor 230 now operates to move the yoke 233 radially outward and thereby close the finishing mold about the parison (Fig. 32). Thereafter, the transfer tongs 46 are opened by means of a stationary piston motor 235 (Fig. 1) mounted on the platform 210. The piston rod or plunger of said motor engages one arm of a lever 236 fulcrumed at 237, the other arm of said lever being operatively connected to the slide plate 194. The motor 235 is timed to operate immediately after the finishing mold has closed about the parison, thus withdrawing the arms 46 and permitting the parison to drop a short distance so that the shoulder 197 seats on the upper end of the finishing mold. A blow-head 238 (Figs. 1 and 33) is now lowered onto the parison and the latter is blown to final shape in the finishing mold. A blow-head 238 is provided for each finishing mold.

Referring to Fig. 35, it will be seen that the intermediate mold 45 is oval shaped in cross-section so that the parison as it is expanded therein is given a corresponding shape approximating the substantially rectangular shape of the finished article as shown in Fig. 36. By the use of the intermediate mold, a much better and more even distribution of the glass is obtained particularly with bottles or other articles of rectangular or other noncircular or irregular shape, than is possible by the usual methods in which the parison is transferred directly from the gathering mold or charge-receiving mold to the finishing mold.

After the article has been blown in the finishing mold at the transfer station E, the mold carriages are indexed and the blown article advanced step by step to the stations F, G, H and I. During this advance, the finishing mold is held closed by a stationary cam track 239 on which the cam rolls 232 run. At the discharge station I, the finishing mold 47 is opened by means of the piston motor 230 which operates through a bell crank comprising arms 240 and 241. The arm 240 is operatively connected with the connector 231. The arm 241 is in position to engage in front of a cam roll 232 when the corresponding finshing mold is at the discharge station I. The operation of the motor 230 to close the mold at the station E also serves to open the mold at the station I. The blown article may be transferred from station I to a conveyor 242 by take-out mechanism which may be of conventional form. Such mechanism as shown includes a pair of air motors 243 carried at the outer ends of arms 244 of a bracket mounted for rotation about a vertical axis. Said motors operate a pair of article gripping fingers 245 (Fig. 34) for engaging and lifting the article and for releasing it to the conveyor. For a detailed disclosure of such mechanism, reference may be had to the above noted Bridges patent, 2,094,422.

The piping for the various air operated motors and their control valves will be understood by reference to Fig. 37 in connection with the following description. The electric motor 92 runs continuously and thereby drives the timer 93 which controls the air pressure supply to the various valves and motors. As the timer rotates, it supplies a puff of air to the pressure line 250 extending to a primary valve 251. It will be noted that in this diagram the valve ports which are connected to the main air pressure line are designated M and the exhaust ports Ex. The air pressure through the pipe 250 moves the piston of the valve 251 to the left, thereby opening the main pressure line through the valve to the line 252, 253, leading to an indexing valve 254 and through said valve and line 255 to the left-hand end of a valve 256 which controls the air supply to the indexing motor 56. This moves the valve 256 to the right, opening the main pressure line to the left-hand end of the motor cylinder and opening the opposite end to exhaust. The motor 56 now operates as heretofore described to rotate or index the mold carriages. As the motor piston completes its stroke, an adjustable stop or pin 257 on the yoke 57a actuates a main air control valve 258 from which lead air lines 259 and 260 extending respectively to opposite ends of the gear shifting motor 62. When the valve 258 is actuated by said stop 257, the main pressure line is opened to line 260 extending to the right-hand or lower end of the motor 62' so that the latter operates to shift the gear 61' from the rack 60' to rack 59' as heretofore described in connection with motor 62 and associated parts. The motor 62' as it shifts the gear 61' also operates through a lever 261 to shift the indexing valve 254. This connects the pressure line 253 through said valve to a line 262 to the right-hand end of the valve 256 so that when the primary valve 251 is reversed, as presently described, the valve 256 is reversed and the motor 56 actuated in the reverse direction. The indexing motor 55, its control valve 256', the indexing valve 254', and the gear shifting motor 62 are controlled from the primary valve 251 in the same manner as the corresponding parts, including the motors 56 and 62' as above described.

Reversal of resetting of the primary valve 251 is controlled by a resetting valve 263 which is actuated by any suitable means (not shown), each time the mold carriages are indexed. When the main air control valve 258' is actuated by the stop pin 257', the main line pressure is opened through said valve 258' and lines 264 and 265 leading to the valve 263 and through line 266 leading from the valve 263 to the primary valve 251. This pressure resets the primary valve so that when the timer again supplies a puff of air through the line 250, the carriage driving motors are again actuated. This time, however, the motors operate in the reverse direction owing to the reverse position of the indexing valves 254 and 254'.

Figure 15:
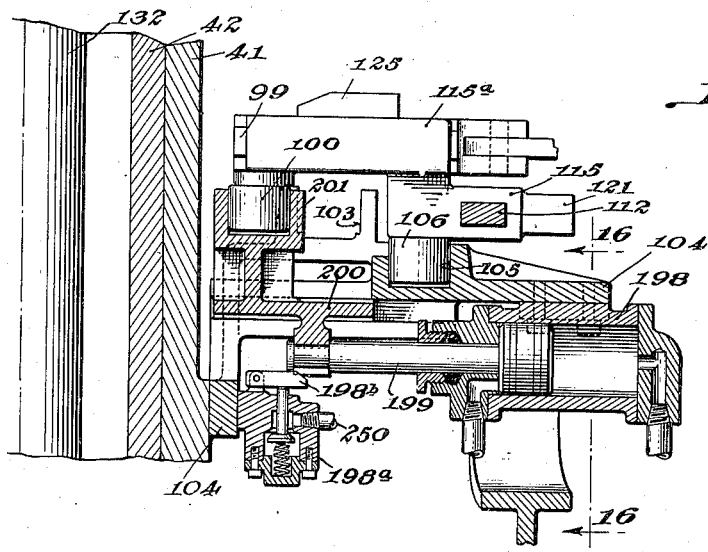
Fig. 15 is a sectional view showing a piston motor for opening the neck molds at the transfer station, the section being taken at the plane of the line 15—15 on Fig. 3.
Figure 16:
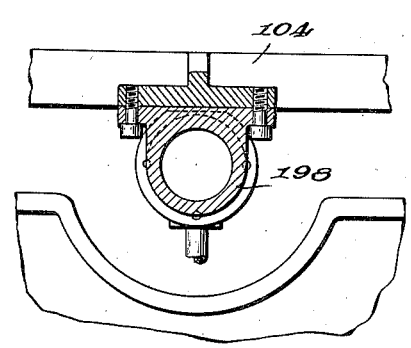
Fig. 16 is a section at the line 16—16 on Fig. 15.

Air pressure lines 267 and 268 lead from the resetting valve 263 and have connected therebetween the motor 235 (Fig. 1) which opens the transfer tongs 46, the motor 230 which closes and opens the finishing molds (Fig. 1), the motor 190 which operates the transfer tongs (Fig. 22), and the motor 198 which opens the neck molds (Fig. 15). The resetting valve 263 is actuated each time the mold carriages are indexed (as before noted) and thereby alternately connects the lines 267 and 268 with air pressure, thus reversing the several motors connected across said lines.

The timer 93 operates to supply pressure through lines 270 and 271 extending to opposite ends of the valve 220 (Fig. 21) which controls the pressure supply to the motor 208 (Fig. 21) for lifting and lowering the blow-head 207, and the motor 150 (Fig. 19) for actuating the baffle 160 and blow-head 146. Said motors 208 and 150 are thus periodically actuated under the control of the timer. A valve 77' controlling the dip head motor 77 (Fig. 2) is under the direct control of the timer, being directly connected thereto through lines 272 and 273.

Modifications may be resorted to within the spirit and scope of our invention.

We claim:

1. A machine for forming hollow glass articles, comprising a mold carriage, means for rotating it about a vertical axis, dip heads on the carriage, parison molds carried by the dip heads, each comprising a body blank mold and a neck mold, mechanism on each dip head for opening the body mold, mechanism on each dip head for opening the neck mold, a stationary horizontally disposed cam plate, cam tracks thereon, cam rolls individual to said mold opening mechanisms and running respectively on said tracks, means for lowering the dip heads and thereby bringing the molds to a charge-receiving position, said cam plate having a portion cut away to permit lowering of said mechanisms, and means for holding the molds closed while traversing said cut-away portion and out of the control of said cam tracks, said last mentioned means including a latch for holding the neck mold closed, and means actuated by the opening movement of the body blank mold to release said latch.

2. A machine for forming hollow glass articles, comprising a mold carriage, means for rotating it about a vertical axis, dip heads on the carriage, parison molds carried by the dip heads, each comprising a body blank mold and a neck mold, mechanism on each dip head for opening the body mold, mechanism on each dip head for opening the neck mold, a stationary horizontally disposed cam plate, cam tracks thereon, cam rolls individual to said mold opening mechanisms and running respectively on said tracks, means for lowering the dip heads and thereby bringing the molds to a charge-receiving position, said cam plate having a portion cut away to permit lowering of said mechanisms, a latch operative to lock the neck mold closed and hold it closed during the lowering of the dip head, and latch releasing means actuated by the opening of the body mold to release said latch.

3. A machine for forming hollow glass articles, comprising a mold carriage, a fluid operated motor for rotating the carriage, a dip head on the carriage, a mold on the dip head, means for lowering the dip head to bring the mold to a charging position, a safety valve controlling the supply of fluid to said motor, and means carried by the dip head for actuating said valve when the dip head is lowered and thereby preventing operation of said motor and rotation of the carriage while the dip head is lowered.

4. A machine for forming glass articles, comprising a mold carriage, means for rotating it about a vertical axis, molds on the carriage, plungers individual to the molds, air operated motors for lifting and lowering the plungers, vacuum valves individual to the molds, air operated motors for actuating said valves to apply suction to the molds, motor control valves individual to and controlling the operation of said air operated motors, said motor control valves mounted to rotate with the carriage, and stationary valve actuating devices in the path of said motor control valves operable to actuate the valves and thereby control the operation of said air motors.

5. A machine for forming glass articles, comprising a mold carriage, means for rotating it about a vertical axis, molds on the carriage, plungers individual to the molds, air operated motors for lifting and lowering the plungers, vacuum valves individual to the molds, air operated motors for actuating said valves to apply suction to the molds, motor control valves individual to and controlling the operation of said air operated motors, said motor control valves mounted to rotate with the carriage, and means for actuating said motor control valves, including lugs on the valves, a horizontally disposed stationary plate, and valve actuating devices mounted on said plate in the path of said lugs.

6. A machine for forming hollow glass articles, comprising a mold carriage, means for rotating it step by step about a vertical axis, an annular series of suction gathering molds mounted on the carriage and brought in succession to a charge-gathering station by said rotation of the carriage, means cooperating with the molds for introducing charges of glass by suction into the molds, means for compacting and blowing the charges of glass in the molds at a station beyond the gathering station, said last mentioned means comprising a plate to close one end of the mold, a blowing head to seat on the opposite end of the mold, an air motor, operating connections between said air motor and said plate for moving the latter into mold closing position, means between said motor and the blow-head to seat the latter on the mold, a valve controlling the supply of blowing air to the blowing head, and automatic means actuated by the seating of the blowing head to open said valve.

JOSEPH P. BENOIT.
RUSSELL G. ALLEN.
LUTHER H. WIDEMAN.